Patented Feb. 16, 1954

2,669,549

UNITED STATES PATENT OFFICE 2,669,549

STABILIZED HALOGEN-CONTAINING RESINS

Joseph R. Darby, Webster Groves, Mo., assignor to Monsanto Chemical Company, St. Louis, Mo., a corporation of Delaware No Drawing. Application December 21, 1951,
Serial No. 262,900

16 Claims. (Cl. 260—23)

This invention relates to a method of improving the stability of halogen-containing resin compositions and the stabilized compositions obtained thereby.

Halogen-containing resins ordinarily undergo discoloration and deterioration on exposure to elevated temperatures such as those employed in molding and processing operations. Various substances have been incorporated in such resins in order to prevent discoloration and deterioration but not always with fully satisfactory results.

In accordance with this invention it has been found that resins obtained from the polymerization of monomers which include or comprise a vinyl halide may be heat stabilized by incorporating therein a mixture of a zinc salt, a calcium chelate derivative of a 1,3-dicarbonylic compound capable of keto-enol tautomerism, and an organic compound containing a

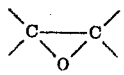

group. The latter is hereafter referred to as an epoxy compound.

The following examples are illustrative of the invention but in no manner are to be construed as limitative thereof. Where parts are mentioned, they are parts by weight.

Compositions comprising, respectively

| Composition | A | B | C | D |
|---|---|---|---|---|
| Polyvinyl chloride parts | 100 | 100 | 100 | 100 |
| 2-Ethylhexyl diphenyl phosphate do | 45 | 45 | 45 | 40 |
| Zinc stearate do | | 0.5 | 0.5 | 0.5 |
| Calcium Ethylacetoacetate do | 2 | | 2 | 2 |
| Butyl Glycidyl Phthalate do | | | | 5 | are prepared by mixing polyvinyl chloride with the respective ingredients in amounts set forth above on differential speed rolls at a roll temperature of 160° C. to form a homogeneous composition which is removed from the rolls in the form of crude sheets. From the crude sheets there are molded finished sheets which are about 0.040 inch in thickness employing a molding cycle of three minutes at 160° C.

The heat stability values set forth below are obtained by heating the molded sheets at 160° C. Initially the sheets of compositions A, B, C and D are substantially colorless.

*Table I*

| Composition | Color after Heating at 160° C. for | |
|---|---|---|
| | 40 minutes | 60 minutes |
| A | Reddish Brown | Black. |
| B | Black | Do. |
| C | Slight Yellow | Yellow. |
| D | Substantially Colorless | Very Slight Yellow. |

As further illustrative of this invention, compositions comprising respectively

| Composition | E | F | G | H |
|---|---|---|---|---|
| Copolymer of 95 parts vinylchloride and 5 parts vinyl acetate parts | 100 | 100 | 100 | 100 |
| 2-Ethylhexyl diphenyl phosphate do | 45 | 45 | 45 | 40 |
| Zinc Stearate do | | 0.5 | 0.5 | 0.5 |
| Calcium Ethylacetoacetate do | 2 | | 2 | 2 |
| Butyl Glycidyl Phthalate do | | | | 5 | are prepared by mixing the copolymer of 95 parts vinyl chloride and 5 parts vinyl acetate with the respective ingredients in amounts set forth above on differential speed rolls at a roll temperature of 160° C. to form a homogeneous composition which is removed from the rolls in the form of crude sheets. From the crude sheets there are molded finished sheets which are about 0.040 inch in thickness employing a molding cycle of three minutes at 160° C.

The heat stability values set forth below are obtained by heating the molded sheets at 160° C. Initially the sheets of compositions E, F, G and H are substantially colorless.

*Table II*

| Composition | Color after Heating at 160° C for— | |
|---|---|---|
| | 40 minutes | 60 minutes |
| E | Dark Brown | Omitted. |
| F | Black | Do. |
| G | Yellow | Dark Brown. |
| H | Substantially Colorless | Very Slight Yellow. |

Results similar to those obtained from compositions D and H are obtained on substituting zinc octoate, zinc laurate, and zinc oleate, respectively, in the same amounts for the zinc stearate in said examples.

Compositions having similarly improved stability are prepared by replacing the epoxy compound of compositions D and H, that is, butyl glycidyl phthalate, with the same amount of, respectively, cyclohexyl-9,10-epoxyoctadecanoate, methyl-9,-10-epoxyoctadecanoate, glycidyl laurate, 2-ethylhexyl glycidyl adipate, 1,2-epoxytetradecane, and 1,2-epoxy-3(2-naphthoxy) propane.

Employing in compositions D and H, respectively, instead of calcium ethylacetoacetate an equal weight of calcium 2-ethylhexylacetoacetate similarly improved results are obtained.

As further illustrative of this invention are the following:

Example I

A plasticized composition containing 100 parts polyvinyl chloride, and 35 parts tricresyl phosphate is stabilized by incorporating therein a mixture of 0.5 part zinc oleate, 3 parts calcium ethylacetoacetate and 5 parts cyclohexyl-9,10-epoxyoctadecanoate. The resulting composition possesses improved heat stability characteristics as compared with a plasticized composition containing 100 parts polyvinyl chloride, 45 parts tricresyl phosphate and 5 parts calcium ethylacetoacetate.

Example II

A mixture of 100 parts of a copolymer of 90 parts vinyl chloride and 10 parts diethyl maleate, 50 parts of 2-ethylhexyl dicresyl phosphate, 0.3 part zinc stearate, 2 parts calcium phenylacetoacetate, and 3 parts methyl-9,10-epoxyoctadecanoate is processed into homogeneous molded sheets in the usual manner. The resultant product exhibits a heat stability comparable to that of composition D.

Example III

A plasticized composition containing 100 parts polyvinyl chloride and 40 parts dodecyl diphenyl phosphate is stabilized by incorporating therein a mixture of 0.2 part zinc octate, 7 parts calcium ethylacetoacetate and 6 parts butyl glycidyl phthalate. The resulting composition possesses improved heat stability characteristics as compared with a plasticized composition containing 100 parts polyvinyl chloride, 50 parts dodecyl diphenyl phosphate, 0.2 part zinc octate and 7 parts calcium ethylacetoacetate.

Example IV

A plasticized composition containing 100 parts polyvinyl chloride and 40 parts dioctyl phthalate is stabilized by incorporating therein a mixture of 0.2 part zinc octate, 7 parts calcium ethylacetoacetate and 6 parts glycidyl butyl phthalate. The resulting composition possesses improved heat stability characteristics as compared with a plasticized composition containing 100 parts polyvinyl chloride, 50 parts dioctyl phthalate, 0.2 part zinc octate and 7 parts calcium ethylacetoacetate.

Example V

A mixture of 100 parts polyvinyl chloride, 35 parts cyclohexyl-9,10-epoxyoctadecanoate, 0.2 part zinc oleate and 5 parts calcium ethylacetoacetate is processed into homogeneous sheets in the usual manner. The resulting composition possesses improved heat stability characteristics as compared with a similarly prepared composition containing 100 parts polyvinyl chloride, 0.2 parts zinc oleate and 40 parts cyclohexyl-9,10-epoxyoctadecanoate.

Example VI

A mixture of 100 parts polyvinyl chloride, 35 parts butyl glycidyl phthalate, 0.2 part zinc oleate and 5 parts calcium ethylacetoacetate is processed into homogeneous sheets in the usual manner. The resulting composition possesses improved heat stability characteristics as compared with a similarly prepared composition containing 100 parts polyvinyl chloride, 0.2 part zinc oleate and 40 parts butyl glycidyl phthalate.

As indicated above, it is found that surprisingly effective stabilizing results are obtained according to this invention with halogen-containing resins generally, numerous examples of which are well known to those skilled in the art. Thus, there may be employed resins made from such vinylidene compounds as vinyl chloride, vinylidene chloride, vinyl chloracetate, chloro styrenes, chloro butadienes, etc. Such vinylidene compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, para-ethyl styrene, divinyl benzene, vinyl naphthalene, alpha-methyl styrene; dienes, such as butadiene, unsaturated amides, such as acrylic acid amide, acrylic acid anilide, unsaturated nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from a halogen-containing vinylidene compound such as vinyl chloride represents a preferred class of polymers to be treated according to the invention.

Among the preferred embodiments of this invention is the stabilization of polymers prepared by the copolymerization of vinyl halides, e. g., vinyl chloride with $\alpha,\beta$-unsaturated polycarboxylic acids such as diethyl maleate or other esters of maleic, fumaric, aconitic, itaconic acids, etc. Among the preferred esters of such acids are alkyl esters in which the alkyl group contains not over eight carbon atoms.

The stabilizer mixture of this invention is also effective when intimately mixed with halogen-containing resins in which part or all of the halogen is introduced into preformed resin, e. g., chlorinated polyvinyl acetate, chlorinated polystyrene, chlorinated polyvinyl chloride, chlorinated natural and synthetic rubbers, rubber hydrochloride, etc.

The stabilizer mixture of this invention is also effective in halogen-containing resins containing halogens other than chlorine, e. g., bromine, fluorine and iodine.

The halogen-containing resins may contain a varying proportion of halogen depending upon the nature of the resin and its contemplated use.

However, as indicated above, vinyl chloride polymers in which the proportion of vinyl chloride units amounts to 50% or more of the total monomer used in making the polymeric product represents a preferred class of polymers to be stabilized according to this invention.

The amounts of the components of the stabilizer combination of this invention may be substantially varied and still result in surprising improvement in stability of the halogen containing resin. Usually at least one part by weight of the calcium compound is used in stabilizing 100 parts by weight of a halogen containing resin and generally from 2 to 10 parts by weight are preferred. The use of less than one part by weight is effective to a considerable degree and amounts larger than 10 parts may be used although further improvement in stability of the resulting compositions is not in direct proportion to the amount used.

Usually the amount of the zinc salt is smaller than that of the calcium compound. Extremely small amounts of the zinc salt have a noticeable effect on the stability but usually at least 0.05 part by weight for every 100 parts by weight of halogen-containing resin is employed and preferably from 0.1 part to 0.5 part. Amounts larger than 0.5 part may be employed but generally speaking, it is not advantageous to incorporate more than 1-2 parts of the zinc salt.

Usually at least 1 part of the epoxy compound is used in stabilizing 100 parts of a halogen-containing resin for most uses and generally, at least 5 parts of the epoxy compound are preferred, although smaller amounts are effective to a considerable degree. Much larger amounts may be used, e. g., 50-100 parts, and serve to lengthen the useful life of the halogen-containing resins although not in direct proportion to the amount used. However, in some cases the epoxy compound may serve both as a plasticizer and an element of the stabilizer mixture and in such cases it may be worth while to incorporate such larger amounts. In general the total amount of zinc salt and calcium compound is smaller than that of the epoxy compound.

The epoxy compounds used in the stabilizer mixture of this invention comprise organic compounds generally containing one or more

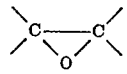

groups. Various substituted and unsubstituted aliphatic, aromatic, alicyclic and heterocyclic groups may be attached to said epoxy groups. Generally, however, the epoxy compounds which are employed should have a boiling point at atmospheric pressure of at least 150° C.; otherwise the stabilizing effect is likely to be relatively transitory due to evaporation of the epoxy compound and preferably the epoxy compounds should have a boiling point of at least 200° C. at atmospheric pressure. Illustrative examples of epoxy compounds which may be used according to the invention are 1,2-epoxytetradecane, 1,2-epoxyoctadecane and other derivatives of long chain alkanes, for example, alkanes having 10–24 carbon atoms having a

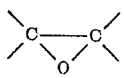

group; epoxy esters containing a long carbon chain such as glycidyl laurate, methyl 9,10-epoxyoctadecanoate, diethylene glycol di-9,10-epoxyoctadecanoate, 9,10-epoxy octadecanyl acetate, 9,10-epoxyoctadecanyl octadecanoate, esters of polycarboxylic acids and alcohols containing a

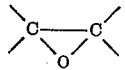

group such as di-2-ethyl hexyl epoxy succinate, butyl glycidyl phthalate, diglycidyl phthalate, propylene glycol diglycidyl phthalate, diethylene glycol diglycidyl maleate, 2-ethyl hexyl glycidyl adipate, hexyl glycidyl sebacate and other esters of these and other poly carboxylic acids containing at least a

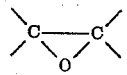

group and epoxidized acids and esters generally containing an unsaturated long chain aliphatic group such as epoxidized animal, vegetable or marine oils or the fatty acids or mixtures of fatty acids contained in such oils and esters thereof, e. g., epoxidized linseed oil, epoxidized soybean oil, epoxidized oleic acid, epoxidized tung oil, the methyl ester of epoxidized linseed oil fatty acids, etc.; glycidols such as glycidol, beta-methyl glycidol, beta-ethyl glycidol, beta-hydroxy methyl glycidol, di-isobutenyl dioxide; epoxidized ethers such as alkyl glycidol ethers in which the alkyl group contains 1-5 carbon atoms, e. g., methyl, ethyl, propyl, butyl, amyl glycidyl ethers; glycidyl ethers containing unsaturated groups such as vinyl, allyl and methyl allyl glycidyl ethers, phenyl glycidyl ether, tolyl glycidyl ethers, naphthyl glycidyl ethers, cyclopentyl glycidyl ether, cyclohexyl glycidyl ether, etc. Other illustrative epoxy compounds include cyclohexene oxide, 1-(2-phenylphenoxy) propylene oxide-2,3, 1-(2-phenyl-cyclohexanoxy) propylene oxide-2,3, 1-(cyclohexanoxy) propylene oxide-2,3, 1-(2-cyclohexylphenoxy) propylene oxide-2,3, 1-(4-tertiary butyl phenoxy) propylene oxide-2,3, styrene oxides such as styrene oxide, para-ethyl styrene oxide, dimethyl styrene oxide, ortho-methoxy styrene oxide, 4-(2,3-epoxy-propoxy) acetyl phenone, the corresponding benzophenone epoxide, 4,4'-di(2,3-epoxy-propoxy) benzophenone, mesityl oxide epoxide, epoxy alkyl and epoxy cycloalkyl amides such as 2-ethyl-3-propyl glycidamide, 2,3-dipropylglycidamide; aryloxyalkene oxides such as phenoxy propene oxide, para-tertiary amyl and para-secondary amyl phenoxy propene oxides.

According to one embodiment of this invention the epoxy compounds are epoxy ethers such as the glycidyl ethers of such polyhydric alcohols as glycerin, diglycerol, erythritol, pentaglycerol, pentaerythritol, mannitol, sorbitol, polyallyl alcohol, polyvinyl alcohol, ethylene glycol, propylene glycol, butylene glycol, etc.

One of the preferred classes of epoxy compounds comprises high molecular weight or resinous epoxy compounds, for example, those made by reacting polyhydric phenols with epichlorhydrin in various ratios in alkaline solution. Among the polyhydric phenols which may be used in preparing such glycidyl ethers are mono-nuclear phenols like resorcinol, catechol, hydroquinone, etc., or polynuclear phenols like bis-(4-hydroxyphenyl)-2,2-propane (bis-phenol), 4,4'-dihydroxy benzophenone, bis-(4-hydroxyphenyl)-1,1-ethane, bis-(4-hydroxyphenyl)-1,1-ethane, bis-(4-hydroxyphenyl)-1,1-isobutane, bis-(4-hydroxyphenyl)-2,2-butane, bis-(4-hydroxy- 2-methylphenyl)-2,2-propane, bis-(4-hydroxy-2-tertiary butyl phenyl)-2,2-propane, bis-(2-dihydroxynaphthyl)-methane, 1,5-dihydroxynaphthalene, phloroglucinol, 1,4-dihydroxy naphthalene, 9,10-hydroxy anthracene, 1,3,6-trihydroxy naphthalene, 4,4-dihydroxy diphenyl, 2,2-bis-(4-hydroxy phenyl) propane and 1,4-bis-(4-hydroxy phenyl) cyclohexane, etc. Such phenols may be reacted with epichlorhydrin in the presence of an inorganic alkaline material to form the epoxy compounds, which, depending upon the conditions of the reaction, may be either monomeric or polymeric materials. Examples of such epoxy compounds include 1,4-diglycidol epoxy benzenes and 2,2-bis(4-glycidol oxyphenyl) propanes.

Other compounds containing a

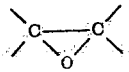

group which may be used in accordance with this invention include those made by reacting alkyl sulfonyl chlorides with glycidol in the presence of ammonia wherein the alkyl group contains up to 20 or more carbon atoms, e. g.,

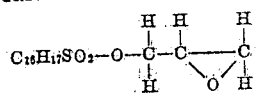

etc.

Various zinc salts may be employed in the stabilizer combination of this invention, for example, zinc salts of organic acids, as well as zinc salts of inorganic acids which give a neutral or alkaline reaction in an aqueous medium, i. e., zinc salts of weak inorganic acids. Examples of zinc salts of organic acids which may be employed are those made from such acids as saturated aliphatic acids, e. g., ethanoic, propanoic, butanoic, pentanoic, hexanoic, heptanoic, octanoic, nonanoic, decanoic, hendecanoic, dodecanoic, tetradecanoic, hexadecanoic and octadecanoic; monoolefinic-unsaturated aliphatic acids such as propenoic acid, 2-butenoic acid, 2-methyl-2-propenoic acid, 3-butenoic acid, 2-pentenoic acid, 4-pentenoic acid, 2-methyl-2-butenoic acid, 2-hexenoic acid, 7-hexadecenoic acid, 10-undecenoic acid, 13-docosenoic acid, 3-hexenoic acid, and 9-octadecenoic acid; diolefinic-unsaturated aliphatic acids such as 2,4-pentadienoic acid, 2,4-hexadienoic acid, 3,7-dimethyl-2,6-octadienoic acid, 9,12-octadecadienoic acid; triolefinic-unsaturated aliphatic acids such as 3,7-dimethyl-2,4,6-octatrienoic acid, 9,12,15-octadecatrienoic acid, 9,11,13-octadecatrienoic acid; substituted olefinic acids, for example, such hydroxy olefinic acids as 2-hydroxy-3-butenoic acid, 16-hydroxy-7-hexadecenoic acid and 12-hydroxy-9-octadecenoic acid; acetylenic unsaturated aliphatic acids such as propynoic, butynoic, pentynoic, amyl propynoic, 7-hexadecynoic, 9-octadecynoic and 13-docosynoic acids.

Mixtures of aliphatic acids may be employed, for example, mixtures of acids occurring in various oils, as for example, linseed, castor, tung, soya bean, perilla, corn, cotton seed, sunflower, safflower, sesame, poppy seed, walnut, peanut, olive, rape seed, whale, dehydrated castor, palm kernel, coconut oil and the like.

Other zinc salts of organic acids may also be used such as zinc salts of aliphatic polycarboxylic acids, e. g., zinc salts of maleic, succinic, adipic and sebacic acids, etc., as well as polycarboxylic acids obtained by polymerization of unsaturated fatty acids, e. g., oleic acid dimer and linoleic acid dimer; salts of aromatic acids, e. g., zinc salts of phenyl-acetic, benzoic, phthalic and salicylic acids; salts of cyclic acids, e. g., the zinc salt of abietic acid.

The zinc salts may be either neutral or basic salts when monocarboxylic acids are used. Mixed salts made from mixtures of acids may also be used.

As examples of zinc salts of weak inorganic acids are zinc salts of carbonic silicic, boric acids and the like.

Of the various zinc salts which may be used in the stabilizer combination of the invention, a preferred class comprises those made from saturated monocarboxylic aliphatic acids containing at least 10 carbon atoms, e. g., 10 to 24 carbon atoms such as those mentioned above.

The calcium chelates which are used in the stabilizer combination of the invention are calcium chelates of derivatives of 1,3-dicarbonyl compounds capable of keto-enol tautomerism such as beta-diketones, beta-ketoacids and the esters of beta-ketoacids.

A preferred class of such calcium compounds are the calcium chelates of ethyl acetoacetate, butyl acetoacetate, 2-ethylbutyl acetoacetate, 2-ethylhexyl acetoacetate, N-octyl acetoacetate, phenylacetoacetate, benzyl acetoacetate, phenylethyl acetoacetate, tolyl acetoacetate as well as other aliphatic and aromatic esters of acetoacetic acid. However, the calcium chelate of the free beta-keto acids such as acetoacetic acid, etc., may be used. Examples of calcium chelates of diketones include those made from acetyl acetone, benzyl acetone, diacetyl acetone, and the like.

The stabilizer combination of this invention is of particular importance in stabilizing halogen-containing resins especially vinyl chloride polymers plasticized with phosphate esters such as the alkyl diaryl phosphates in which the alkyl group contains 6-14 carbon atoms and the aryl groups are phenyl or cresyl groups, i. e., ortho-, meta- or paracresyl groups and mixtures thereof since compositions containing such plasticizers have proved to be especially difficult to stabilize. Examples of such esters include 2-ethylhexyl diphenyl phosphate, 2-ethylhexyl dicresyl phosphate, 2-ethylhexyl phenyl cresyl phosphate, hexyl diphenyl phosphate, hexyl phenyl cresyl phosphate, hexyl dicresyl phosphate, dodecyl diphenyl phosphate, dodecylphenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually however, from 10 to 100 parts of the esters are used for every 100 parts of vinyl chloride-containing resin.

As indicated by the examples, plasticizers other than alkyl diaryl phosphate esters may be employed as well as mixtures of such phosphate esters and such conventional plasticizers as dioctyl phthalate, tricresyl phosphate, butyl phthalyl butyl glycolate, etc. In the case of certain halogen-containing resins no plasticizers are required.

In addition to the stabilizer combination of the invention, other heat stabilizers and also light stabilizers may be included, if desired, examples of which are well known to those skilled in the art as well as other conventional additives such as other resins, lubricants, coloring materials, etc.

Co-pending application Serial No. 204,092, filed January 2, 1951, of J. R. Darby et al. describes and claims compositions comprising halogen-containing resin compositions and as stabilizers therefor mixtures of zinc salts and calcium chelate derivatives of a 1 3-carbonylic compounds capable of keto-enol tautomerism.

The foregoing description is given in illustration and not in limitation of the invention as set forth in the appended claims.

What is claimed is:

1. A composition resistant to the discoloration effects of heat comprising a halogen-containing resin and as a stabilizer therefor in stabilizing amounts a mixture of a zinc salt, a calcium chelate derivative of a 1,3-dicarbonylic compound capable of keto-enol tautomerism, and an epoxy compound.

2. A composition resistant to the discoloration effects of heat comprising a chlorine-containing resin and as a stabilizer therefor a mixture containing at least 0.05 part by weight per 100 parts by weight of said resin of a zinc salt, at least 1 part by weight per 100 parts by weight of said resin of a calcium chelate derivative of a 1,3-dicarbonylic compound capable of keto-enol tautomerism, and at least 1 part by weight per 100 parts by weight of said resin of an epoxy compound.

3. A composition resistant to the discoloration effects of heat comprising a halogen-containing resin and as a stabilizer therefor a mixture containing at least 0.05 part by weight per 100 parts by weight of said resin of a zinc salt, at least 1 part by weight per 100 parts by weight of said resin of calcium ethylacetoacetate, and at least 1 part by weight per 100 parts by weight of said resin of an epoxy compound.

4. A composition resistant to the discoloration effects of heat comprising a halogen-containing resin and as a stabilizer therefor a mixture containing from 0.1 to 0.5 parts by weight of a zinc salt of an organic acid, from 2 to 10 parts by weight of a calcium chelate derivative of a 1,3-dicarbonylic compound capable of keto-enol tautomerism, and from 5 to 100 parts by weight of an epoxy compound, said weight proportions being based upon 100 parts by weight of said resin polymer.

5. A composition resistant to the discoloration effects of heat comprising a chlorine-containing resin and as a stabilizer therefor a mixture containing from 0.1 to 0.5 parts by weight of a zinc salt of an organic acid, from 2 to 10 parts by weight of a calcium chelate derivative of a 1,3-dicarbonylic compound capable of keto-enol tautomerism, and from 5 to 100 parts by weight of an epoxy compound, said weight proportions being based upon 100 parts by weight of said resin polymer.

6. A composition resistant to the discoloration effects of heat comprising a halogen-containing resin and as a stabilizer therefor a mixture containing from 0.1 to 0.5 parts by weight of a zinc salt of a monocarboxylic saturated aliphatic acid containing at least 10 carbon atoms, from 2 to 10 parts by weight of a calcium chelate derivative of a 1,3-dicarbonylic compound capable of keto-enol tautomerism, and from 5 to 100 parts by weight of an epoxy compound, said weight proportions being based upon 100 parts by weight of said resin polymer.

7. A composition resistant to the discoloration effects of heat comprising a vinyl chloride polymer and as a stabilizer therefor a mixture containing from 0.1 to 0.5 parts by weight of a zinc salt of an organic acid, from 2 to 10 parts by weight of a calcium chelate derivative of a 1,3-dicarbonylic compound capable of keto-enol tautomerism, and from 5 to 100 parts by weight of an epoxy compound, said weight proportions being based upon 100 parts by weight of said resin polymer.

8. A composition resistant to the discoloration effects of heat comprising polyvinyl chloride and as a stabilizer therefor a mixture containing from 0.1 to 0.5 parts by weight of a zinc salt of an organic acid, from 2 to 10 parts by weight of a calcium chelate derivative of a 1,3-dicarbonylic compound capable of keto-enol tautomerism, and from 5 to 100 parts by weight of an epoxy compound, said weight proportions being based upon 100 parts by weight of said resin polymer.

9. A composition resistant to the discoloration effects of heat comprising a vinyl chloride-vinyl acetate copolymer and as a stabilizer therefor a mixture containing from 0.1 to 0.5 parts by weight of a zinc salt of an organic acid, from 2 to 10 parts by weight of a calcium chelate derivative of a 1,3-dicarbonylic compound capable of keto-enol tautomerism, and from 5 to 100 parts by weight of an epoxy compound, said weight proportions being based upon 100 parts by weight of said resin polymer.

10. A composition resistant to the discoloration effects of heat comprising a vinyl chloride-diethyl maleate copolymer and as a stabilizer therefor a mixture containing from 0.1 to 0.5 parts by weight of a zinc salt of an organic acid, from 2 to 10 parts by weight of a calcium chelate derivative of a 1,3-dicarbonylic compound capable of keto-enol tautomerism, and from 5 to 100 parts by weight of an epoxy compound, said weight proportions being based upon 100 parts by weight of said resin polymer.

11. A heat resistant composition comprising a vinyl chloride polymer and as a stabilizer therefor a mixture containing from 0.1 to 0.5 parts by weight of zinc stearate, from 2 to 10 parts by weight of calcium ethylacetoacetate and from 5 to 100 parts by weight of an epoxy compound having a boiling point of at least 150° C., said weight proportions being based upon 100 parts by weight of said polymer.

12. A heat resistant composition comprising a vinyl chloride polymer and as a stabilizer therefor a mixture containing from 0.1 to 0.5 parts by weight of zinc stearate, from 2 to 10 parts by weight of calcium ethylacetoacetate and from 5 to 100 parts by weight of an epoxy compound having a boiling point of at least 200° C., said weight proportions being based upon 100 parts by weight of said polymer.

13. A heat resistant composition comprising 100 parts by weight of a vinyl chloride polymer, from 10 to 100 parts by weight of a phosphate ester plasticizer and as a stabilizer therefor a mixture containing from 0.1 to 0.5 parts by weight of zinc stearate, from 2 to 10 parts by weight of calcium ethylacetoacetate and from 5 to 100 parts by weight of an epoxy compound having a boiling point of at least 200° C.

14. A heat resistant composition comprising 100 parts by weight of a vinyl chloride polymer, from 10 to 100 parts by weight of an alkyl diaryl phosphate in which the alkyl group contains 6 to 14 carbon atoms and the aryl radical is selected from the group consisting of phenyl and cresyl radicals and as a stabilizer therefor a mixture containing from 0.1 to 0.5 parts by weight of zinc stearate, from 2 to 10 parts by weight of calcium ethylacetoacetate and from 5 to 100 parts by weight of an epoxy compound having a boiling point of at least 200° C.

15. A heat resistant composition comprising 100 parts by weight of a vinyl chloride-vinyl acetate copolymer, from 10 to 100 parts by weight of an alkyl diaryl phosphate in which the alkyl group contains 6 to 14 carbon atoms and the aryl radical is selected from the group consisting of phenyl and cresyl radicals and as a stabilizer therefor a mixture containing from 0.1 to 0.5 parts by weight of zinc stearate, from 2 to 10 parts by weight of calcium ethylacetoacetate and from 5 to 100 parts by weight of an epoxy compound having a boiling point of at least 200° C.

16. A heat resistant composition comprising 100 parts by weight of a vinyl chloride-diethyl maleate copolymer, from 10 to 100 parts by weight of an alkyl diaryl phosphate in which the alkyl group contains 6 to 14 carbon atoms and the aryl radical is selected from the group consisting of phenyl and cresyl radicals and as a stabilizer therefor a mixture containing from 0.1 to 0.5 parts by weight of zinc stearate, from 2 to 10 parts by weight of calcium ethylacetoacetate and from 5 to 100 parts by weight of an epoxy compound having a boiling point of at least 200° C.

JOSEPH R. DARBY.

References Cited in the file of this patent

UNITED STATES PATENTS

| Number | Name | Date |
|---|---|---|
| 2,307,075 | Quattlebaum et al. | Jan. 5, 1943 |
| 2,557,089 | Gamrath et al. | June 19, 1951 |
| 2,564,646 | Leistner et al. | Aug. 14, 1951 |
| 2,590,059 | Winkler | Mar. 18, 1952 |